April 10, 1956  B. COOPER ET AL  2,741,529
SCALE RECORDER

Filed Dec. 20, 1951  4 Sheets-Sheet 1

FIG. I.

INVENTORS.
BENJAMIN COOPER
ALBERT F. HOHMANN
BY
ATTORNEY.

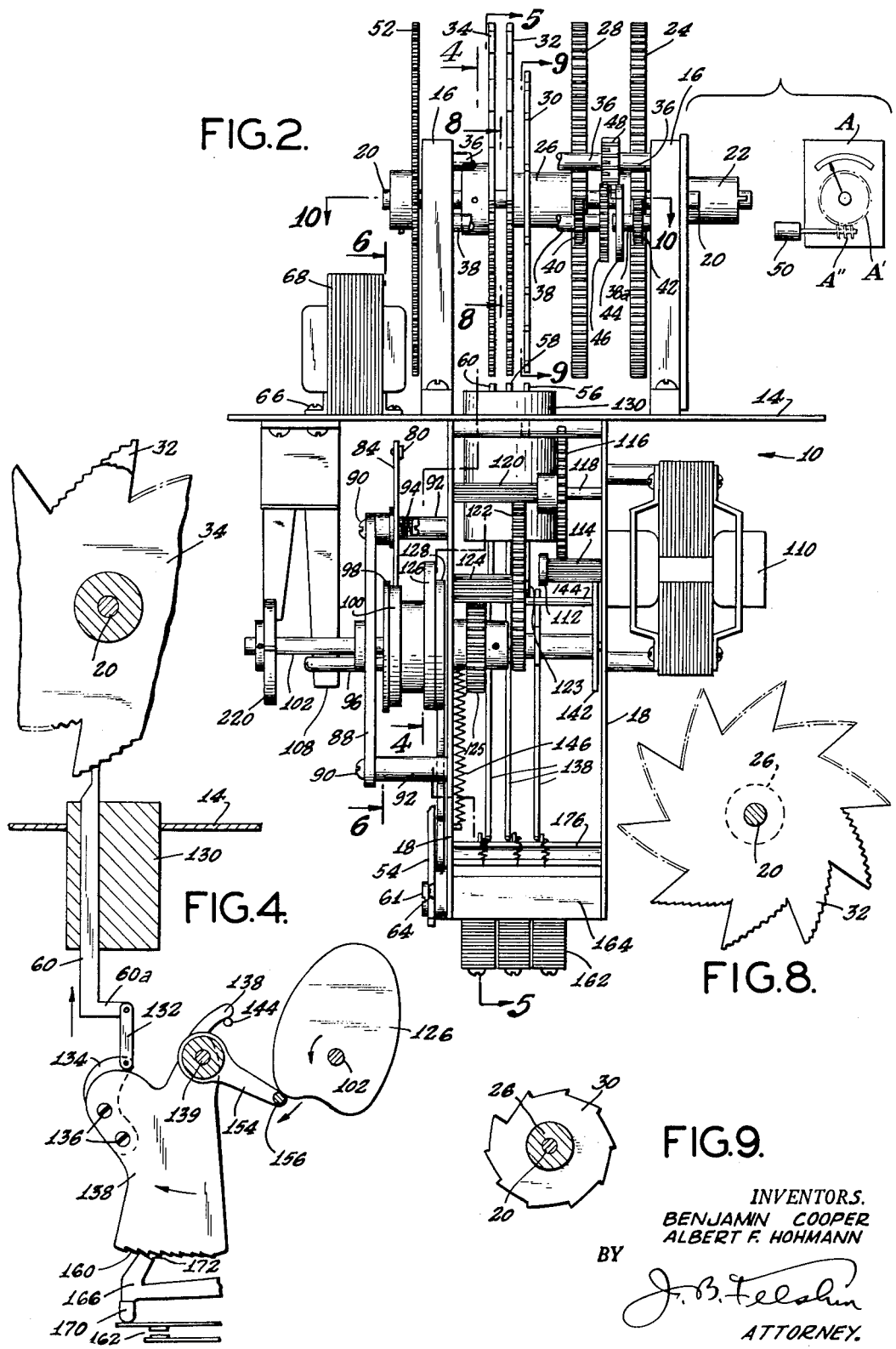

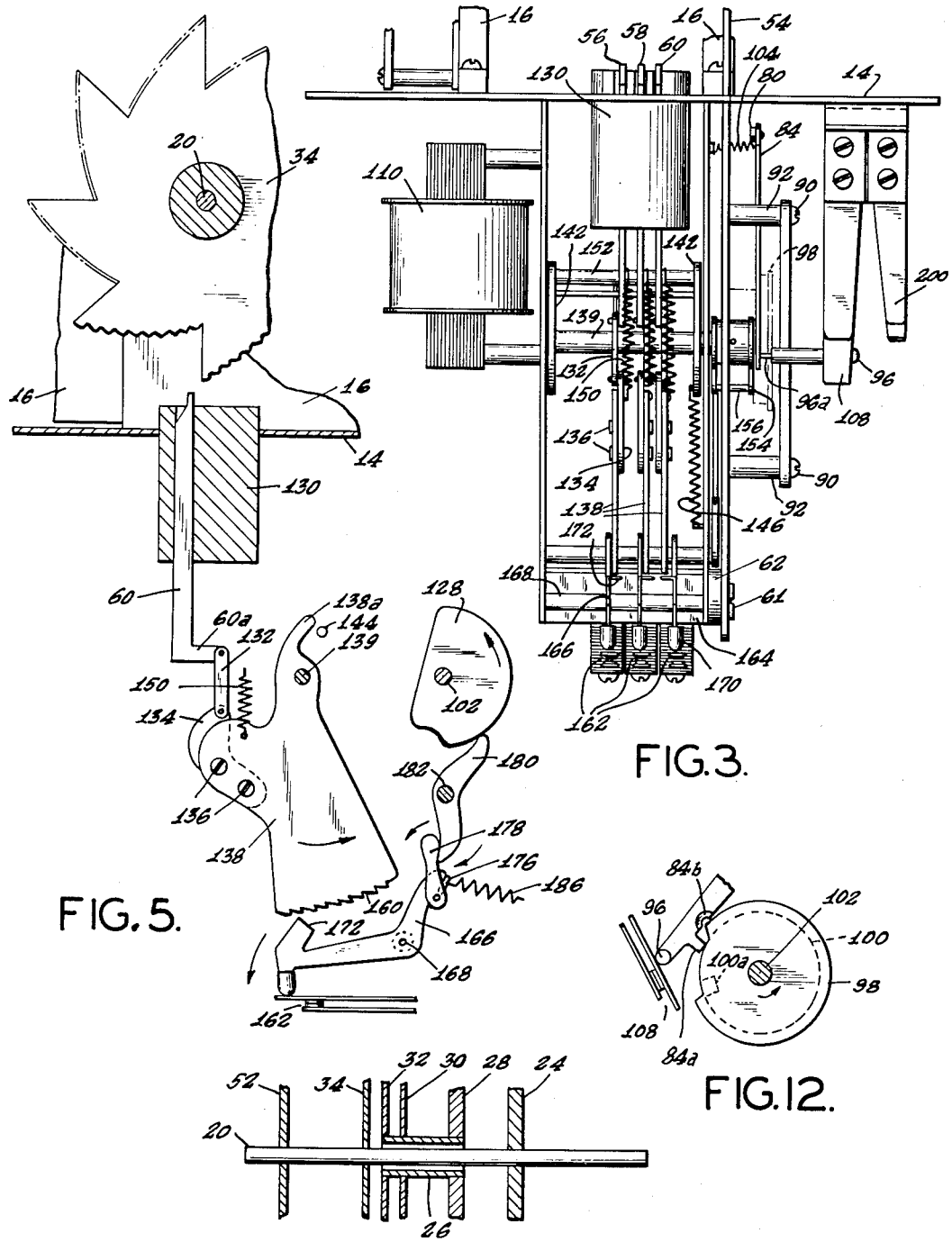

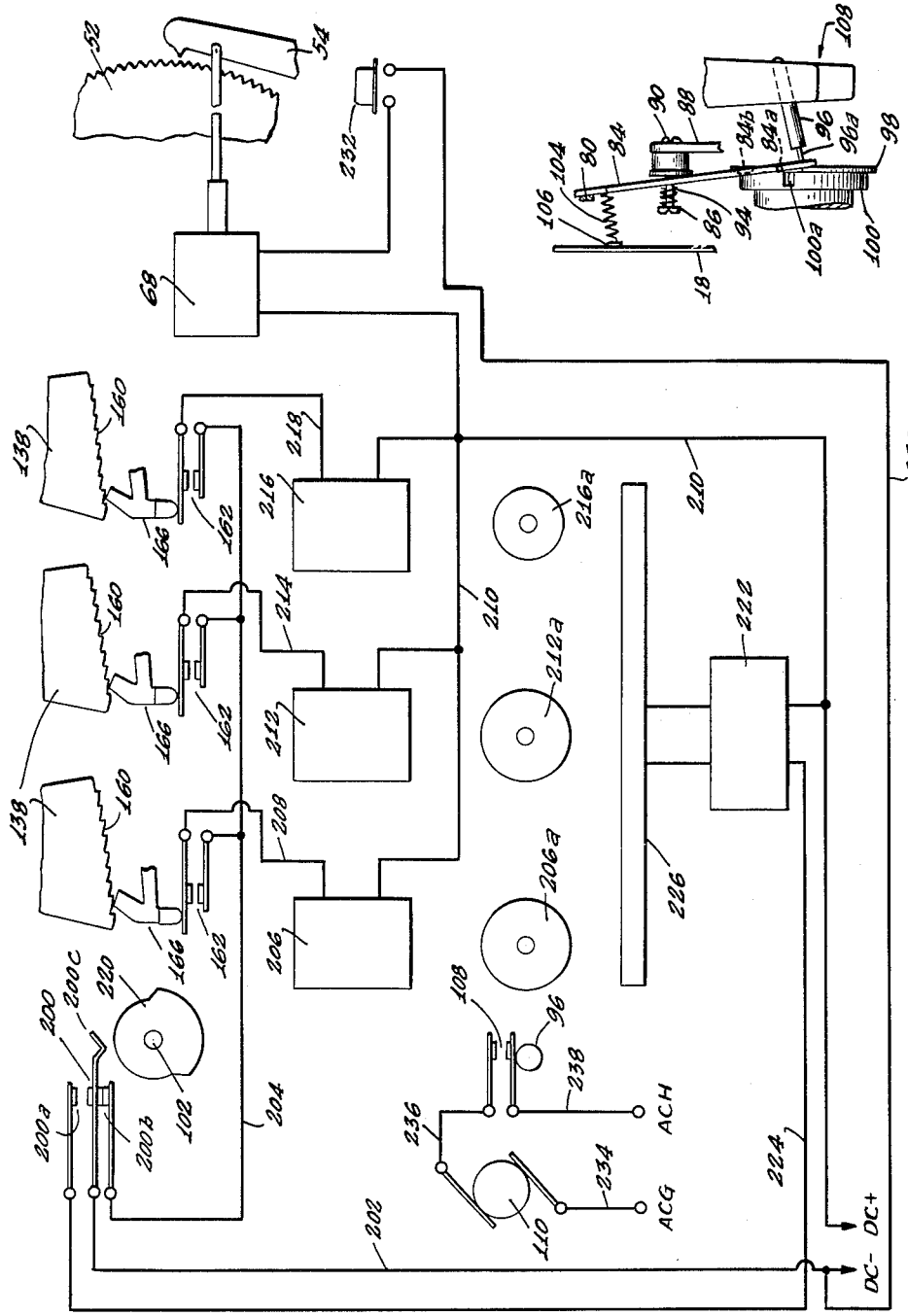

United States Patent Office 2,741,529
Patented Apr. 10, 1956

2,741,529

SCALE RECORDER

Benjamin Cooper, New York, N. Y., and Albert F. Hohmann, Teaneck, N. J., assignors, by direct and mesne assignments, to Research Electronics & Devices Co., Inc., Bayonne, N. J., a corporation of New Jersey Application December 20, 1951, Serial No. 262,597

7 Claims. (Cl. 346—98)

This invention relates generally to recording devices and in particular to a device for recording measured values indicated by an associated measuring device.

The invention is particularly adapted for use with electronic potentiometers wherein rotary scale means is displaced in accordance with measured values. Said rotary scale means may be of the type that requires a fraction of one revolution, a complete revolution, or several revolutions to indicate full deflection thereof. The scale indicator may perform through an arc, a linear scale, or a concentric scale. However, a basic requirement of the measuring devices is that rotary means are present and that said rotary means revolve during measuring operations. The present invention is coupled to said rotary means directly or through proportionate gearing to rotate in accordance with the degree of rotation of the scale rotary means. The rotatable member in the present invention comprises a shaft having a stepping wheel secured thereto and further provided with a sleeve having plural stepping wheels thereon. Appropriate transfer means interconnect the respective stepping wheels whereby said stepping wheels rotate in a direct proportional ratio to the rotation of said scale means in said measuring device.

The invention further provides sensing means that are selectively operable to sense the relative positions of said stepping wheels to control electro-magnetic counters of the type disclosed in applicants' Patent Number 2,293,934, issued August 25, 1942. The counters disclosed in the cited patent have raised peripheral indicia thereon against which printing means are adapted to be pressed. A recording strip interposed between said counter wheels and said printing means records the particular settings of said wheels.

Thus, the relative position of a scale indicator may be instantaneously recorded without interfering with the operation of the associated measuring device.

Therefore, one of the important objects of the present invention resides in the provision of means operable to rotate in direct proportion to the displacement of an indicating scale of a measuring device.

Another object of the present invention is to provide in a recording device of the character described means to sense said rotary means and actuate associated counters in accordance with the angle of rotation of said rotary means.

A further object resides in the provision of means operable to control printing means to print against said counters after said rotary means has been sensed.

Another object is to provide locking means operable to momentarily arrest the rotation of said rotary means during the sensing thereof;

And another object of the invention is to provide transfer means interposed between the plural stepping wheels whereby proportional rotational ratios may be predetermined to effect rotation of the respective stepping wheels in rotary increments corresponding to units, tens and hundreds.

Other ancillary objects will be, in part, hereinafter apparent and will in part be hereinafter pointed out.

In the drawings:

Figure 1 is a side elevation of the invention illustrating the control cams, the sensing means, and the locking mechanism.

Figure 2 is a front elevation of the invention with parts of the frame work cut away to more fully illustrate the rotary means and transfer mechanism associated therewith.

Figure 3 is a rear elevation of the sensing means.

Figure 4 is a cross-section taken along line 4—4 of Fig. 2.

Figure 5 is a cross-section taken along line 5—5 of Fig. 2.

Figure 8 is a fragmentary cross-section of a tens stepping wheel taken along line 8—8 of Figure 2.

Figure 9 is a reduced fragmentary cross-section of the hundreds stepping wheel taken along line 9—9 of Figure 2.

Figure 10 is a fragmentary schematic cross-section taken along line 10—10 of Figure 2 illustrating the associated elements mounted on the main drive shaft.

Figure 11 is a schematic wiring diagram of the control circuits for the invention.

Figure 12 is a fragmentary detail of the one-revolution clutch with the motor switch in closed position.

Figure 13 is a detail plan view of the mechanism illustrated in Figure 12.

Figures 6, 7:
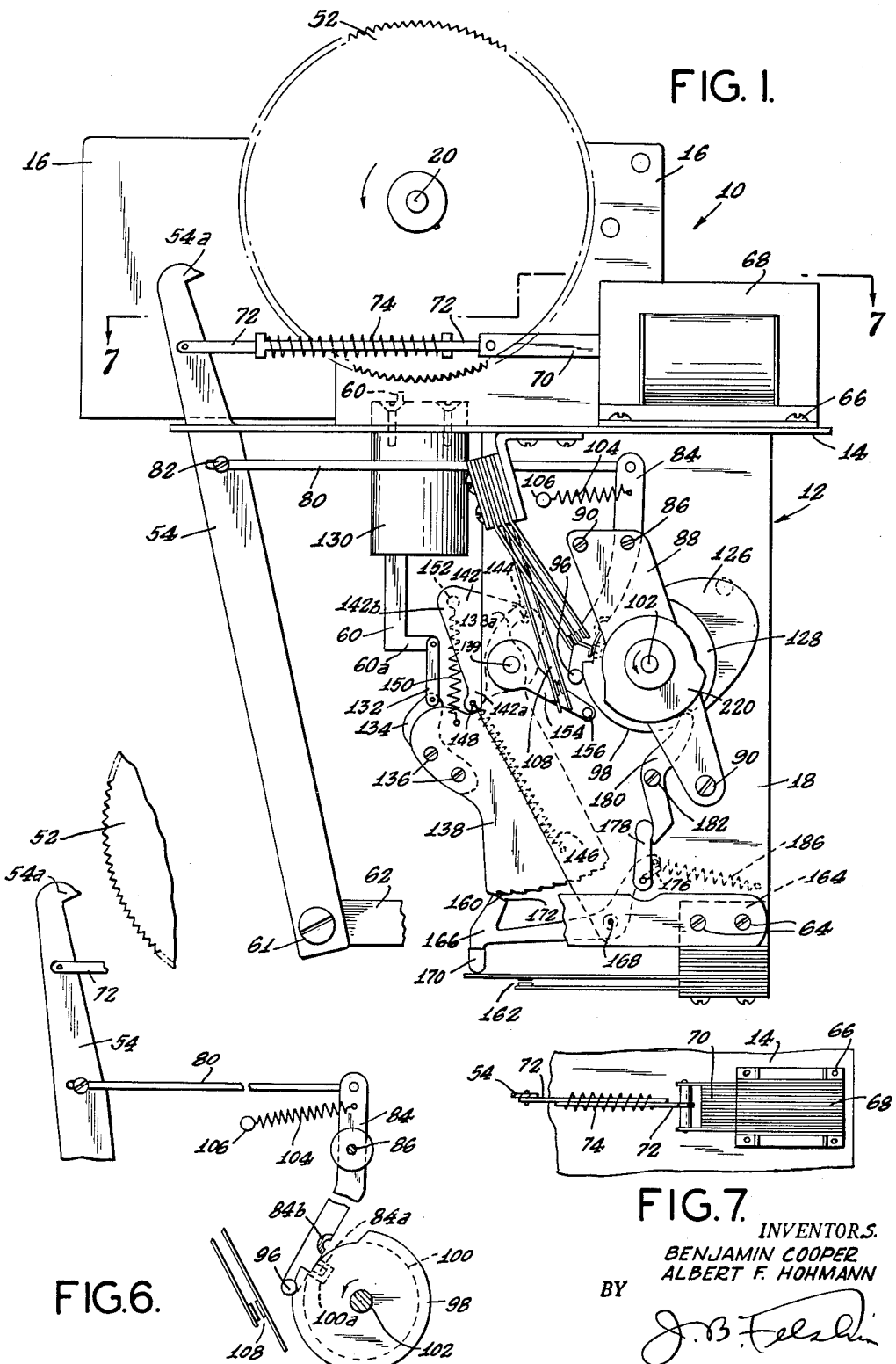
Figure 6 is a fragmentary cross-section taken along line 6—6 of Figure 2, of the locking mechanism and control cams therefor.
Figure 7 is a fragmentary plan view of the locking mechanism actuating means.

The present invention essentially provides a vernier action whereby a predetermined angle of rotation of an indicator scale in a measuring device is subdivided into increments representative of decimal fractions recordable up to and including 0.999.

Referring to the drawings in detail, 10 generally designates the recording device. Said device comprises a frame 12 having a horizontal plate member 14 and plural upstanding spaced vertical walls 16 affixed to the upper surface thereof. Depending from horizontal member 14 are plural spaced plates 18. Journalled in vertical walls 16 is a main drive shaft 20 having a coupling 22 secured to one terminal thereof that projects externally of one of the walls 16. Disposed adjacent the inner side of the aforesaid wall 16 and secured to shaft 20 is a gear 24. Journalled on shaft 20 is a sleeve 26 having a gear 28 secured at one end thereof and carrying stepping wheels 30 and 32. Affixed to shaft 20 and disposed adjacent to stepping wheel 32 is a third stepping wheel 34. Stepping wheel 34 is designated the units wheel, while stepping wheels 32 and 30 are known as the tens and hundreds stepping wheels respectively. Disposed between the respective vertical walls 16 are a stub shaft 36 and coaxial jack shafts 38, 38a. Jack shafts 38 and 38a are journalled in the respective walls 16 and are adapted for rotation by means of pinions 40, 42 engaging gears 28 and 24 respectively. Jack shaft 38a has affixed thereto a mutilated gear 44 having one tooth thereon. Jack shaft 38 has affixed thereto a pinion 46. Mutilated gear 44 and pinion 46 are adapted to cooperate with a transfer pinion 48 journalled on stub shaft 36. Gear 24 is adapted to rotate gear 28 on sleeve 26 in a proportional ratio of one to ten. Thus, one rotation of shaft 20 will produce one-tenth of one rotation of sleeve 26.

The coupling 22 affixed to shaft 20 is adapted to engage a coupling member 50 associated with a measuring instrument A. Gear A' is adapted to rotate with the deflection of a dial pointer on said instrument. Gear A' meshes with pinion A" which is in turn connected to coupling member 50. The ratio between gear A' and pinion A" is onehundred to one. Thus, the full deflection of the pointer is measurable as nine-hundred ninety-nine units.

Accordingly, full rotation of shaft 20 and sleeve 26 will dispose stepping wheels 30, 32 and 34 at their maximum positions whereby, when sensed, a reading of ninehundred ninety-nine will be recorded. Stepping wheel 30, the hundreds stepping wheel, has the periphery thereof divided into ten equal increments each having a differing reduced radius relative to shaft 20. Stepping wheels 32 and 34 each having the periphery thereof divided into ten equal increments. Each increment is further subdivided into ten steps of increments having successively diminishing radii relative to shaft 20. Affixed to the other end of shaft 20 is a star wheel 52 having onehundred teeth thereon. Star wheel 52 cooperates with a latch member 54 to lock the aforesaid stepping wheels against rotation during the sensing thereof by sensing fingers 56, 58 and 60, hereinafter described in detail. Locking member 54, is pivotally secured at the lower end thereof, as by screw 61, to forwardly extending member 62. Member 62 is affixed to depending wall 18, as by screws 64. Affixed to horizontal plate 14, as by screws 66, is solenoid 68 having plunger 70 actuable upon the energization thereof. Pivotally secured to plunger 70 is a T-shaped link 72. Pivotally secured to locking member 54 is a second T-shaped link 72 that is adapted to extend parallel to the former link 72. As shown in Figure 1, a coil spring 74 is circumjacently disposed around both of the members 72 with the ends thereof abutting against the respective heads of said links. Accordingly, when solenoid 68 is energized plunger 70 is drawn therein. Links 72 and locking member 54 are moved clockwise as viewed in Figure 1, until projection 54a on member 54 engages star wheel 52. Thus, projection 54a centers star wheel 52 and shaft 20 relative to the nearest unit value. A link 80 pivotally secured to member 54, as by screw 82, is adapted to actuate lever 84 when member 54 is moved to locking position. Lever 84 is pivotally mounted, as by screw 86, on a plate 88. Plate 88 is mounted, as by screws 90, and spacers 92 in parallel relation with depending plate 18. A coil spring 94 resiliently urges lever 84 into parallel relation with pate 88. Affixed to the other end of lever 84 is a transversely extending insulated finger 96. Finger 96 is further provided with peripheral recess 96a in which a radially extending flange 98 normally resides. Flange 98 is formed integrally with a cam 100 that is affixed to a driven shaft 102. Shaft 102 is journalled in the depending walls 18 and plate 88 and is driven by means hereinafter described. Cam 100 is further provided with a peripheral recess 100a in which a projection 84a of member 84 normally resides. The portion of flange 98 adjacent to recess 100a is cut-away to form a cam surface. A spring 104 is affixed at one end thereof to a pin 106 affixed to side wall 18. The other end of said spring is secured to the lever 84 and normally urges said lever counter-clockwise as viewed in Figure 1 to retain finger 96 in engagement with flange 98.

Upon the energization of solenoid 68 and the actuation of member 54, link 80 pivots lever 84 clockwise displacing projection 84a out of recess 100a in cam 100. As soon as said projection reaches the periphery of flange 98, spring 104 urges lever 84, Figs. 12 and 13 to rock about screw 86 to position projection 84a on the periphery of flange 98. The clockwise movement of lever 84 carries finger 96 into engagement with the normally open contacts 108 closing said contacts. With the projection 84a residing on flange 98, contacts 108 are held closed. The counter-clockwise rotation of cam 100 and flange 98 effects the engagement of the latter with an angular recess 84b formed in lever 84 to cam lever 84 back to its initial position against the tension of spring 104.

Projection 84a then resides on cam 100 and is retained thereon by flange 98 through rotation of shaft 102. Prior to the complete rotation of shaft 102 projection 84a drops into cam recess 100a thus opening contacts 108 and arresting the rotation of shaft 102.

Means are provided to sense stepping wheels 30, 32, and 34. Said means hereinafter described is actuable by motor 110 which is energized by the closure of switches 108. Motor 110 is mounted on one of the depending walls 18 and has a shaft 112 extending therethrough. Shaft 112 carries a pinion 114 which is disposed in engagement with a pinion 116 rotatable on a shaft 118. A pinion 120 rotatable with gear 116 engages a second gear 122 which is journalled on a stub shaft 123. Pinion 124 secured to gear 122 engages a pinion 125 affixed to shaft 102. Accordingly, the energization of motor 110 rotates shaft 102. Cams 126 and 128 secured to shaft 102 are adapted to rotate therewith. As shown in Figure 1, cams 126, 128 control the sensing means now to be described. A guide block 130 is secured to plate 14 and extends therethrough and terminates in spaced relation to the stepping wheels 30, 32 and 34. Slidably mounted in block 130 are a plurality of sensing fingers 60, 58 and 56. Referring to Figure 4, sensing finger 60 is shown in sensing relation with stepping wheel 34. The lever end of finger 60 is provided with rearwardly extending arm portion 60a which is pivotally secured to a link 132. The other end of link 132 is pivotally secured to an attaching member 134. Member 134 is secured to segment 138 by means of screws 136. Segments 138, there being one for each of the sensing fingers 56, 58 and 60, are journalled on shaft 139. An upwardly extending projection 138a on each of the segments is adapted to engage rod 144 transversely extended between a pair of bell cranks 142 secured to shaft 139. A spring 146 is secured to each segment and to a rod 148 interposed between arms 142a of bell cranks 142. A spring 150 is connected between each segment and a rod 152 interposed between arms 142b of the bell cranks 142. Affixed to shaft 139 are a pair of arms 154 having a rod 156 interposed between the ends thereof. Rod 156 is disposed for engagement with the periphery of an eccentric cam 126 affixed to shaft 102. Accordingly, counter-clockwise rotation of cam 126 as viewed in Figure 4, rotates arms 154 and shaft 139 in a clock-wise direction during the first half of a cycle of rotation of shaft 102. Spring 146 is accordingly tensioned and the related segment 138 is rotated in a clockwise direction. The related sensing finger moves upwardly to engage the respective stepping wheel. Springs 146 and 150 are provided to enable shaft 139 to swing through a complete arc irrespective of the arrested positions of sensing fingers 56, 58 and 60. It is readily apparent that the respective sensing fingers are arrested in differing positions of upward travel.

The lowermost periphery of segment 138 is formed with serrations 160 and during the clockwise movement of said segment, a switch 162 associated therewith is alternately opened and closed thereby. Switches 162 are secured to a horizontal plate 164 interposed between the lower terminals of depending plates 18. Associated with each switch is a pulsing lever 166 pivotally mounted on a transverse rod 168 disposed between walls 18. Carried on one end of each lever 166 is an insulated contacting member 170 disposed to engage one contact of each switch 162. A flange portion 172 extending transversely from lever 166 is adapted to engage serration 160 on the segment 138. Thus, counter-clockwise movement of segments 138 alternately opens and closes switches 162 to pulse counting means hereinafter described.

Means are provided to move levers 166 out of engagement with serrations 160 on the second half of the cycle of rotation of shaft 102 whereby said segments are free to rotate counterclockwise to their initial positions under the influence of springs 146. Toward this end there is provided a bar 176 interposed between depending walls 18 and provided with concentric extensions that are journalled in said walls. One of said extensions projects through wall 18 and has secured thereto an arm 178. Arm 178, is engageable by a lever 180 pivotally mounted, as by screw 182, on the exterior surface of wall 18. The opposite end of lever 180 is disposed in peripheral engagement with a cam 128 affixed to shaft 102. As is particularly well shown in Figure 5, counter-clockwise rotation of cam 128 does not effect lever 180 until substantially one-half of a cycle of rotation has occurred, at which time lever 180 is urged clockwise. Arm 178 is moved counter-clockwise and bar 176 engages the retained arms on levers 166. Said levers are similarly rotated counter-clockwise out of engagement with the segments 138 and so remain until the cycle of rotation of cam 128 has been substantially completed, at which time, levers 166 return to engage said segments. A spring 186 secured to one end to bar 176 and at the other end to a pin affixed to wall 18, restores levers 166 to engaging relation with segments 138.

Referring to Figure 11, there is shown a schematic wiring diagram of the controlling circuits of the invention. Switch 200 having fixed contacts 200a and 200b and a swinging contact 200c, is normally disposed with contacts 200b and 200c in engaged relation while shaft 102 is at rest and during the first half of a cycle of rotation thereof. Thus, switch 200 completes a circuit from a source of D. C. potential over conductor 202, through contacts 200b and 200c, over conductor 204 to one contact of each of the switches 162. The other contact of each of the switches 162 is connected to a respective electro-magnetic counter coil. For example, units counter 206 has one terminal of the coil thereof connected by conductor 208 to the aforesaid contact of switch 162. The other terminal of the coil of counter 206 is connected by conductor 210 to the positive source of D. C. potential. Similarly, tens counter 212 is connected by conductor 214 to the other terminal of switch 162 associated therewith. The remaining terminal of the coil of counter 212 is connected by conductor 210 to the source of positive D. C. potential. Hundreds counter 216 is connected by conductor 218 to the other terminal of switch 162 associated therewith. The remaining terminal of the coil of counter 216 is connected by conductor 210 to the positive source of D. C. potential. Thus, the closure and opening of switches 162 by the related segments 138 pulses the respective counters to actuate printing wheels in accordance with the number of impulses received.

At approximately one-half of a cycle of rotation of shaft 102, Figures 1, 2, 6 and 11, cam 220 on shaft 102 engages contact 200c of switch 200 and moves said contact out of engagement with contact 200b and into engagement with contact 200a thereby interrupting the negative circuit to the counter units. Contacts 200a and 200c then complete a circuit to a printing solenoid 222.

This circuit may be traced as follows: from the negative source of D. C. potential over conductor 202, through closed contacts 200a and 200c, over conductor 224 to one terminal of the coil of solenoid 222. The other terminal of said coil is connected by conductor 210 to the source of positive D. C. potential. Solenoid 222 when energized, moves platen 226 to engagement with the printing wheels associated with the respective counters. It is apparent that a recording medium interposed between the platen 226 and the counter printing wheels will record the particular settings of the stepping wheels. Means, not shown, but described in the Patent #2,293,934 to Cooper, issued August 25, 1942, restore the printing wheels to zero position upon a print being taken.

The energizing circuit for a solenoid 68 may be traced from the negative source of D. C. potential, over conductor 230 to a manually operable push button 232, through said push button, when actuated, to one terminal of the coil of solenoid 68. The other terminal of said coil is connected by conductor 210 to the source of D. C. positive potential. Thus, actuation of push button 232 will energize solenoid 68 to initiate the recording at any desired moment of the positions of stepping wheels 56, 58 and 60.

Further, the motor controlling circuit may be traced from a source of alternating current designated as ACG, over conductor 234 to one terminal of motor 110. The opposite terminal of motor 110 is connected by conductor 236 to one contact of switch 108. The other contact of said switch is connected by conductor 238 to the source of alternating current designated ACH.

It will thus be seen that there is provided a device in which the several objects of this invention are achieved and which is well adapted to meet the conditions of practical use.

The invention claimed is:

1. In a recording device of the character described, in combination, a rotatable shaft, instrument means for rotating said shaft, a sleeve journalled on said shaft and differentially rotatable with respect there to, a peripherially stepped wheel secured thereon, a peripherially stepped wheel affixed to said shaft, transfer means coupling said sleeve to said shaft, means to arrest rotation of said shaft, means to actuate said arresting means, electric motive means operable upon actuation of said arresting means, means controlled by the steps on the stepped wheels, operable upon the operating of said electric motive means, to sense the relative angular positions of said stepped wheels, and means controlled by said electric motive means to release said arresting means.

2. In a recording device of the character described, in combination, a rotatable shaft, instrument means for rotating said shaft, a sleeve journalled on said shaft and differentially rotatable with respect thereto, a peripherially stepped wheel secured thereon, a peripherially stepped wheel affixed to said shaft, transfer means coupling said sleeve to said shaft, means to arrest rotation of said shaft, means to actuate said arresting means, electric motive means operable upon actuation of said arresting means sensing means controlled by the steps on said stepped wheels, means operable upon the operating of said electric motive means to actuate said sensing means, to sense the relative angular positions of said stepped wheels, and means controlled by said electric motive means to maintain said arresting means in arrested position.

3. In a recording device of the character described, in combination, a rotatable shaft, instrument means for rotating said shaft, a sleeve journalled on said shaft and differentially rotatable with respect thereto, a peripherially stepped wheel secured thereon, a peripherially stepped wheel affixed to said shaft, transfer means coupling said sleeve to said shaft, means to arrest rotation of said shaft, means to actuate said arresting means, electric motive means operable upon actuation of said arresting means, sensing means controlled by the steps on said stepped wheels, means operable by said electric motive means to actuate said sensing means, to sense the relative angular positions of said stepped wheels, means controlled by said electric motive means to maintain said arresting means in arrested position, pulsing means operable by said sensing means, and counting means operable by said pulsing means.

4. In a recording device of the character described, in combination, a rotatable shaft, instrument means for rotating said shaft, a sleeve journalled on said shaft, a peripherially stepped wheel secured thereon, a peripherially stepped wheel affixed to said shaft, transfer means coupling said sleeve to said shaft, means to arrest rotation of said shaft, means to actuate said arresting means, electric motive means operable upon actuation of said arresting means, sensing means controlled by the steps on said stepped wheels, means operable by said electric motive means to actuate said sensing means, to sense the relative angular positions of said stepped wheels, means controlled by said electric motive means to maintain said arresting means in arrested position, pulsing means operable by said sensing means, counting means operable by said pulsing means, and means controlled by said electric motive means to render said pulsing means inoperative.

5. In a recording device of the character described, in combination, a rotatable shaft, instrument means for rotating said shaft, a sleeve journalled on said shaft, a peripherially stepped wheel secured thereon, a peripherially stepped wheel affixed to said shaft, transfer means coupling said sleeve to said shaft, means to arrest rotation of said shaft, means to actuate said arresting means, electric motive means operable upon actuation of said arresting means, sensing means controlled by the steps on said stepped wheels, means operable by said arresting means to actuate said sensing means, to sense the relative angular positions of said stepped wheels, means controlled by said electric motive means to maintain said arresting means in arrested position, pulsing means operable by said sensing means, counting means operable by said pulsing means, means controlled by said electric motive means to render said pulsing means inoperative, means to print against said counting means, and means controlled by said electric motive means to operate said printing means after said pulsing means has been rendered inoperative.

6. In a recording device of the class described, in combination a pair of spaced supporting walls, a shaft journalled therebetween, a sleeve journalled on said shaft and differentially rotatable relative thereto, transfer means interconnecting said shaft with said sleeve, a stepping wheel affixed to said sleeve, a stepping wheel affixed to said shaft, means to rotate said shaft, a serrated disc affixed to said shaft, means operable to engage said serrated disc to arrest rotation of said shaft, an electric motor, means to energize said motor upon the operating of said shaft arresting means, and means operable by said motor to maintain said motor energizing means in operated condition for a predetermined period of time.

7. In a recording device of the class described, in combination a pair of spaced supporting walls, a shaft journalled therebetween, a sleeve journalled on said shaft and differentially rotatably relative thereto, transfer means interconnecting said shaft with said sleeve, a stepping wheel affixed to said sleeve, a stepping wheel affixed to said shaft, means to rotate said shaft, a serrated disc affixed to said shaft, means operable to engage said serrated disc to arrest rotation of said shaft, an electric motor, means to energize said electric motor upon the operating of said shaft arresting means, means operable by said motor to maintain said motor energizing means in operated condition for a predetermined period of time, and means to render said energizing means inoperative at the completion of said predetermined period of time.

References Cited in the file of this patent

UNITED STATES PATENTS

| | | |
|---|---|---|
| 1,963,303 | Holmes | June 19, 1934 |
| 2,188,766 | Buckley | Jan. 30, 1940 |
| 2,288,761 | Williams | July 7, 1942 |
| 2,293,934 | Cooper | Aug. 25, 1942 |
| 2,370,805 | Leonard | Mar. 6, 1945 |
| 2,549,870 | Wallace | Apr. 24, 1951 |